United States Patent [19]

Holm

[11] 3,751,880

[45] Aug. 14, 1973

[54] CARRIER GAS SEPARATING UNIT

[75] Inventor: Michael W. Holm, Monrovia, Calif.

[73] Assignee: Universal Monitor Corporation, Pasadena, Calif.

[22] Filed: Feb. 22, 1972

[21] Appl. No.: 227,879

[52] U.S. Cl. .................................... 55/158, 55/197
[51] Int. Cl. ............................................ B01d 53/22
[58] Field of Search ................. 55/16, 67, 158, 197, 55/386

[56] References Cited
UNITED STATES PATENTS

| | | | |
|---|---|---|---|
| 3,429,105 | 2/1969 | Llewellyn et al. | 55/158 |
| 3,344,586 | 10/1967 | Langley et al. | 55/158 |
| 3,498,027 | 3/1970 | Buchter | 55/197 |
| 3,437,357 | 4/1969 | Rubin | 55/158 |

Primary Examiner—Charles N. Hart
Attorney—Keith D. Beecher et al.

[57] ABSTRACT

A gas separating unit is provided for enriching a gas sample emerging from a gas chromatograph, or other source, such as the ambient atmosphere, liquid inlet device, etc., before the sample is introduced to a mass spectrometer gas analyzer. This separation is achieved by removing the carrier gas of the sample from the sample constituents which are to be subjected to mass spectrometric analysis in the analyzer. The separating unit of the invention makes use of a semipermeable membrane which is mounted in a unique housing. The housing is constructed, as will be described, so that the sample and carrier gases are directed across the membrane in a manner so as to make full use of the surface of the membrane, and to assure that all the gas mixture passing into the separating unit contacts the membrane.

4 Claims, 2 Drawing Figures

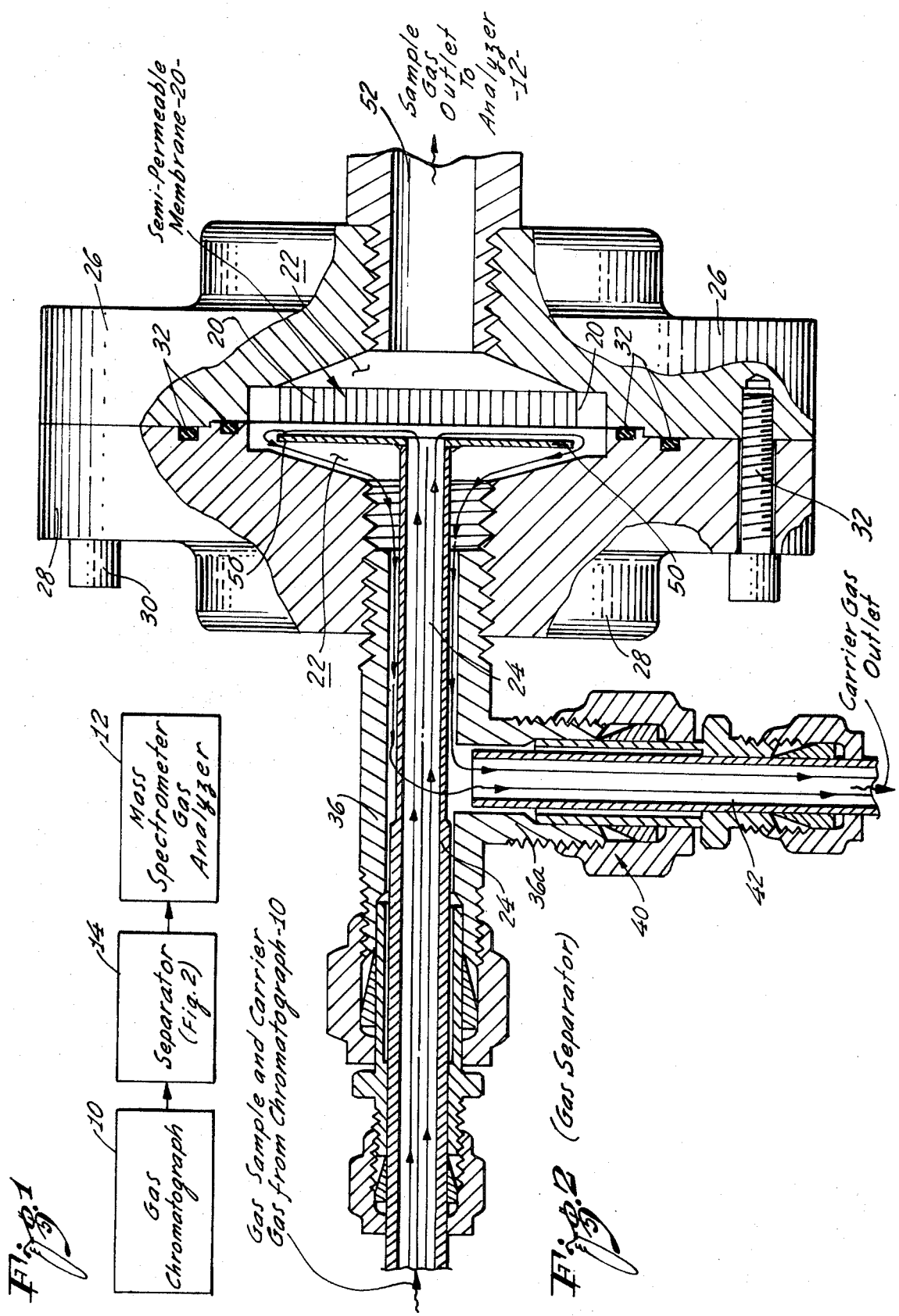

CARRIER GAS SEPARATING UNIT

BACKGROUND OF THE INVENTION

It is known in the art to perform in a mass spectrometer gas analyzer an analysis of sample components of a gas mixture separated in a gas chromatograph. For such analysis, it is most desirable to interpose a gas separating unit between the chromatograph and the analyzer. The purpose of the separating unit is to remove the carrier gas from the sample constituents, so that the sample is introduced into the analyzer in an enriched form, thereby increasing the system sensitivity and reducing the burden on the vacuum pumps.

Attempts have been made in the past to remove the carrier gas, and such attempts initially involved a porous separating tube enclosed by a vacuum jacket. Such a separating device is described, for example, in *Analytical Chemistry*, Vol. 34, No. 6, May 1964, pages 1135-1137. It was found, however, that the porous tube separating device was unsatisfactory insofar as the removal of the carrier gas is concerned. This is due principally to the small inner surface area of the separating tube which actually contacted the carrier gas. However, any attempts to increase the inner surface area of the separating tube results in the enlargement of the inner space which causes diffusion and re-mixing of the sample components which were separated in the gas chromatograph.

A more recent carrier gas separating system is described, for example, in U.S. Pat. No. 3,429,105. The gas separating unit described in that patent includes a pair of spaced permeable membranes of which the ratio of the permeabilities of the carrier gases to the constituent sample gases is less than unity. These membranes comprise the separating elements. Appropriate vacuum pumping means is used to produce the necessary pressure differentials across the membranes.

In addition to the need and desirability of extracting the carrier gas from the mixture to enhance the concentration of the sample gas, it is necessary to provide a pressure drop between the chromatograph column, which operates at atmospheric pressure, and the analyzer which operates at vacuum pressure up to, for example, $10^{-8}$ torr. Apparatus for separating the sample gas from the carrier gas, and for providing a suitable interface between the chromatograph at atmospheric pressure and an analyzer at vacuum pressure is described in the aforesaid U.S. Pat. No. 3,429,105. Other prior art apparatus for accomplishing this is described, for example, in *Analytical Chemistry* for April 1964 in an article entitled "Use of A Mass Spectrometer as a Detector and Analyzer for Effluents Emerging From High Temperature Gas Liquid Chromatography Columns" by Raynar Ryhage.

The apparatus of the present invention separates the carrier from the sample on a highly efficient basis, as will be described, and it has the feature of providing a simple and inexpensive unit using a semi-permeable membrane, and one which is constructed to assure that none of the gas sample can pass through the unit without encountering the membrane surface for optimum separation from the carrier gas.

Preferably, the membranes used in the apparatus of the present invention are constructed from materials selected from the group consisting of polymers and stationary liquid phases. Stationary liquid phases are those liquid materials employed in chromatographic columns to partition materials to be separated. Comprehensive lists of such materials may be found in numerous publications, for example, "Gas Chromatography" by Ernest Bayer published by Elsevier Publishing Co., New York 1961, Tables 213 and 214.

Polymers and stationary liquid phases are characterized by necessarily being free from holes. Hence, gaseous state material can pass through the membranes only by diffusion. In order to diffuse through the membrane, the gaseous material must first be captured by the membrane either by entering into solution with it, or becoming adhesively attached to its surface. Although most gases can be captured by the membrane materials, the carrier gases generally will be captured at a much lower rate, especially at ambient temperatures.

The aforesaid property of the membrane material is used to facilitate the analyzing of the sample gases. In operation, a pressure difference is established across the membranes, and the gas mixture is passed across the surface of the membrane at the high pressure side. The sample gases will readily enter into solution with the membrane material and diffuse through the membrane, to be directed into the gas analyzer. However, most of the carrier gas will pass across the surface of the membrane to an appropriate exhaust.

Therefore, the basic property of the semi-permeable membrane is its ability to function as a liquid phase, and most gaseous state materials, with the exception of helium and the permanent gases, readily enter into solution with the membrane material and diffuse through the membrane. Therefore, when the carrier gas and the sample gas constituents come into contact with the membrane, a partition takes place, and the respective rates at which the materials are passed through the membrane are determined by their qualities of solubility and diffusion. The semi-permeable membranes of the type which may be used in the apparatus of the invention are described, for example, in U.S. Pat. No. 3,335,545 — Robb et al.

BRIEF DESCRIPTION OF THE DRAWING

FIG. 1 is a block diagram showing a typical gas analytical system; and

FIG. 2 is a section of a gas separator unit which may effectively be used in the system of FIG. 1.

DETAILED DESCRIPTION OF THE ILLUSTRATED EMBODIMENT

The analytical system of FIG. 1 combines a gas chromatograph column 10 with a mass spectrometer gas analyzer 12, and a coupling unit 14. The coupling unit 14 may be constructed in accordance with the concepts of the invention, as shown in FIG. 2. As described above, the separator 14 serves to separate the sample gas constituents from the carrier gas so as to enrich the concentration of the sample gases, and it also serves as an appropriate interface between the atmospheric pressure chromatograph 10 and the vacuum pressure gas analyzer 12.

The basic function of the chromatograph 10 is to separate the components of a gas on the basis of the affinity or absorbability with respect to the partitioning material which is used in the chromatograph column. While the chromatograph is an extremely useful analytical instrument, its results are quantitative rather than qualitative. This is because the only means by which a fraction from the column may be identified is a relative one, this being achieved, for example, by comparing the retention time of a particular fraction with the retention time of a known element or compound. Even this means is not too satisfactory, since many compounds have the same or nearly the same retention time.

It is therefore the present-day practice to collect the fractions that are eluted from the gas chromatograph column and to subject the fractions to chemical analysis by mass spectrometer means to obtain further qualitative and quantitative information. In carrying out the latter process, the mass spectrometer gas analyzer 12 is connected to the chromatograph 10 to analyze the various fractions as they are eluted from the chromatograph. The combination of a chromatograph and mass analyzer provide an analytical system which is capable of providing rapid identification and quantitative analysis of simple or complex sample mixtures. Moreover, the system lends itself readily to automatic controls, and is extremely accurate in its operation.

The separator 14, as described above, employs a semi-permeable membrane 20 which serves to partition the sample gases from the permanent gas carrier, so as to provide a highly enriched sample of the constituent gases for the analyzer 12. As shown in FIG. 2, the inlet gas sample and carrier gas mixture are carried into an internal chamber 22 through an elongated tubular member 24. The chamber 22 is formed, for example, by two housing sections 26 and 28 which are held together by appropriate screws 30 and which are sealed by O-rings 32, or other appropriate sealing gaskets.

The semi-permeable membrane 20 is supported across the chamber 22, and it serves to separate the chamber into two compartments. The tubular member 24 is supported in a concentric tubular housing 36 which, in turn, is threaded into the casting, or other structure which forms the housing section 28. The tubular housing 36 also supports a second housing assembly 40 which is threaded to a radial integral bushing 36a of the housing 36, and which extends radially with respect to the housing 36. A further tubular member 42 is supported in the housing 40 in essentially coaxial relationship.

It will be observed from FIG. 2 that the inner part of the tubular member 24 is in spaced coaxial relationship with the tubular housing 36, so as to define an annular passageway from the interior of the left-hand compartment of the chamber 22, and the interior of the tubular member 42. A baffle 50 is welded, or otherwise affixed to the inner end of the tubular member 24, and the baffle extends across the adjacent face of the semipermeable membrane 20 in spaced parallel relationship with that surface. An exit port 52 is provided in the housing section 26 from the right-hand compartment of the chamber 22, and from the opposite side of the membrane 20.

With the construction illustrated in FIG. 2, the gas sample and carrier gas from the chromatograph 10 is carried through the tubular member 24 to the surface of the semipermeable membrane 20, and the gas is then directed by the baffle 50 to flow across the entire face of the membrane. The carrier gas is not passed through the membrane 20, and is directed to the exhaust carrier gas outlet tubular member 42, as described above. The gas sample, on the other hand, passes through the semipermeable membrane and appears in an enriched and concentrated form at the outlet port 52 for introduction to the analyzer 12.

The improved construction of the present invention causes the mixture of gas sample and carrier gas, as it flows through the chamber, to pass across the entire surface of the semi-permeable membrane 20. This is in contradistinction with most of the prior art units which are constructed in such a way that a material proportion of the inlet gas mixture passes through the unit without contacting the membrane, so that a substantial amount of the sample gases are lost. Also, the prior art construction is such that there is a tendency for a non-uniform distribution of the gases across the membrane surface with the central part of the membrane in the prior art units, for example, being exposed to a substantially greater amount of the gas mixture than the edge portion. The construction of the present invention, on the other hand, provides for a uniform exposure of the entire surface of the membrane 20 to the incoming gas mixture.

Attempts have been made in the prior art to provide machining alterations to the internal membrane chamber in an attempt to achieve a uniform flow of the gas across the entire membrane surface, and in order to prevent gases from flowing through the chamber without contacting the membrane surface. However, the desired results are achieved in the unit of the present invention by a simple baffle structure, and without the need for expensive maching operations.

It is clear that although a particular embodiment of the invention has been shown and described, modifications may be made. For example, a separator may be constructed in accordance with the invention which incorporates a plurality of units, such as shown in FIG. 2, cascaded with respect to one another further to enhance the enrichment of the sample. It is intended, therefore, to cover all such modifications which fall within the spirit and scope of the invention, in the following claims.

What is claimed is:

1. A gas separator unit for coupling a source, such as a gas chromatograph, or the like, to a gas analyzer, comprising: a housing defining an enclosed and hermetically sealed chamber; membrane means hermetically mounted within said chamber and extending thereacross to divide said chamber into two hermetically isolated compartments; a baffle mounted in one of said compartments and extending across a face of said membrane means in close proximity therewith and in spaced and parallel relationship; inlet means coupled to said housing for introducing a mixture of sample and carrier gases from said source into the space between said baffle and said face of said membrane means; first outlet means coupled to said housing and extending out from the other compartment of said chamber for passing the sample gases to said analyzer; and second outlet means mounted on said housing and extending out from said first-mentioned compartment of said chamber for exhausting said carrier gases, said inlet means comprising an elongated tubular member extending into said housing and affixed to said baffle to surround a central aperture therein, and said inlet means further comprising a tubular housing for supporting said tubular member on said first-named housing, said tubular housing and said tubular member being radially spaced from one another and in coaxial relationship so as to define an annular passage into said one of said compartments; and said second outlet means comprising an elongated tubular member communicating with said annular passage, and supported radially on said tubular housing.

2. The combination defined in claim 1, in which said inlet means and said first outlet means are in axial alignment with one another on opposite sides of said membrane means.

3. The combination defined in claim 1, in which said membrane means comprises a semipermeable membrane of which the permeability of carrier gases and the permeability of sample gases is in a ratio of less than unity.

4. The combination defined in claim 3, in which said semipermeable membranes are constructed from material selected from a group consisting of polymers and stationary liquid phases.

* * * * *